(12) United States Patent
Fu et al.

(10) Patent No.: US 11,306,019 B2
(45) Date of Patent: *Apr. 19, 2022

(54) ION EXCHANGEABLE GLASSES WITH HIGH CRACK INITIATION THRESHOLD

(71) Applicant: Corning Incorporated, Corning, NY (US)

(72) Inventors: Qiang Fu, Painted Post, NY (US); Xiaoju Guo, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 649 days.

This patent is subject to a terminal disclaimer.

(21) Appl. No.: 15/625,264

(22) Filed: Jun. 16, 2017

(65) Prior Publication Data

US 2017/0283303 A1  Oct. 5, 2017

Related U.S. Application Data

(62) Division of application No. 14/481,383, filed on Sep. 9, 2014, now Pat. No. 9,714,188.

(60) Provisional application No. 61/877,492, filed on Sep. 13, 2013.

(51) Int. Cl.
*C03C 3/091* (2006.01)
*C03C 21/00* (2006.01)

(52) U.S. Cl.
CPC ............ *C03C 3/091* (2013.01); *C03C 21/002* (2013.01); *Y10T 428/315* (2015.01)

(58) Field of Classification Search
None
See application file for complete search history.

(56) References Cited

U.S. PATENT DOCUMENTS

| | | | |
|---|---|---|---|
| 3,008,841 A | 11/1961 | Tiede | |
| 3,772,135 A | 11/1973 | Hara et al. | |
| 5,277,946 A | 1/1994 | Nagai et al. | |
| 5,785,726 A | 7/1998 | Dorfeld et al. | |
| 5,824,127 A | 10/1998 | Bange et al. | |
| 6,065,309 A | 5/2000 | Cooper et al. | |
| 6,128,924 A | 10/2000 | Bange et al. | |
| 7,969,113 B2 | 6/2011 | Ide | |
| 8,075,999 B2 | 12/2011 | Barefoot et al. | |
| 8,586,492 B2 | 11/2013 | Barefoot et al. | |
| 9,145,333 B1* | 9/2015 | Dejneka | C03C 3/091 |
| 9,346,703 B2 | 5/2016 | Bookbinder et al. | |
| 2003/0109370 A1 | 6/2003 | Ikenishi et al. | |
| 2005/0250639 A1 | 11/2005 | Siebers et al. | |
| 2006/0242996 A1 | 11/2006 | DeAngelis et al. | |
| 2006/0288736 A1 | 12/2006 | Kamihori et al. | |
| 2008/0028795 A1 | 2/2008 | Kamihori et al. | |
| 2008/0286548 A1 | 11/2008 | Ellison et al. | |
| 2009/0142568 A1 | 6/2009 | Dejneka et al. | |
| 2010/0009154 A1 | 1/2010 | Allan et al. | |
| 2010/0084016 A1 | 4/2010 | Aitken et al. | |
| 2011/0201490 A1 | 8/2011 | Barefoot et al. | |
| 2011/0294648 A1 | 12/2011 | Chapman et al. | |
| 2012/0052271 A1 | 3/2012 | Gomez et al. | |
| 2012/0297829 A1 | 11/2012 | Endo et al. | |
| 2013/0122313 A1* | 5/2013 | Gross | C03C 3/064 428/428 |
| 2014/0023865 A1 | 1/2014 | Comte et al. | |
| 2015/0140299 A1 | 5/2015 | Ellison et al. | |
| 2015/0152003 A1* | 6/2015 | Kawamoto | C03C 21/002 428/220 |
| 2015/0368147 A1 | 12/2015 | Dejneka et al. | |

FOREIGN PATENT DOCUMENTS

| | | |
|---|---|---|
| EP | 1593658 B1 | 12/2007 |
| JP | 2011310432 | 11/1999 |
| JP | 200119466 | 1/2001 |
| JP | 200816879 A | 8/2008 |
| JP | 2009-196879 A | 9/2009 |
| JP | 2009233911 | 10/2009 |
| JP | 2011-213576 A | 10/2011 |
| WO | 2011114821 A1 | 9/2011 |
| WO | 2013006301 A1 | 1/2013 |
| WO | 2014025068 A2 | 2/2014 |
| WO | 2014120628 | 8/2014 |

OTHER PUBLICATIONS

English Translation of JP2016542803 Office Action dated May 5, 2018; 3 Pages; Japanese Patent Office.
International Search Report and Written Opinion of the International Searching Authority; PCT/US2014/055288; dated Mar. 30, 2015; 8 Pages.
F.P. Hall; "The Influence of Chemical Composition on the Physical Properties of Glazes"; Publication Date: Jan. 20, 1930; pp. 182-199.
Korean Patent Application No. 10-2016-7009176, Notice of Allowance dated Feb. 25, 2021, 3 pages (1 page of English Translation and 2 pages of Original Document); Korean Patent Office.

* cited by examiner

*Primary Examiner* — David Sample

(57) ABSTRACT

Alkali boroaluminosilicate glasses with high resistance to crack initiation and damage due to sharp impact are provided. The glass compositions have melting and forming temperatures that allow forming the glass into sheets via float-based processes while still allowing for the glass to be efficiently ion exchanged. The glass compositions contain MgO, and when ion exchanged, have a Vickers indentation crack initiation load of at least about 10-15 kgf.

10 Claims, 5 Drawing Sheets

ION EXCHANGEABLE GLASSES WITH HIGH CRACK INITIATION THRESHOLD

CROSS REFERENCES TO RELATED APPLICATIONS

This application is a Divisional application of U.S. application Ser. No. 14/481,383, filed on Sep. 9, 2014, which claims the benefit under 35 U.S.C. § 119 to U.S. Provisional Application Ser. No. 61/877,492, filed on Sep. 13, 2013, the content of each are relied upon and incorporated herein by reference in their entirety.

BACKGROUND

The disclosure relates to damage resistant glasses. More particularly, the disclosure relates to damage resistant glasses that are capable of being formed into sheets via a float process. Even more particularly, the disclosure relates to damage resistant, boron-containing glasses that have optionally been strengthened by ion exchange.

SUMMARY

Alkali boroaluminosilicate glasses are provided that, when strengthened, are resistant to damage due to sharp impact and capable of fast ion exchange. The glasses comprise a combination of $SiO_2$, $Al_2O_3$, $B_2O_3$, and an alkali oxide, and, when ion exchanged, have a Vickers indentation crack initiation load of at least about 12 kgf.

Accordingly, one aspect comprises an alkali boroaluminosilicate glass comprising:
from about 60 to about 70 mol % $SiO_2$
from about 8 to about 13 mol % $Al_2O_3$
from about 9 to about 15 mol % $B_2O_3$
from about 2 to about 8 mol % MgO
from about 8 to about 13 mol % $M_2O$.
In some embodiments, $M_2O$ comprises $Na_2O$. In some compositions, the glass is phosphate free or substantially free of phosphate.

Another aspect comprises an alkali boroaluminosilicate glass comprising:
from about 62 to about 69 mol % $SiO_2$
from about 9 to about 12 mol % $Al_2O_3$
from about 10 to about 14 mol % $B_2O_3$
from about 3 to about 7 mol % MgO
from about 9 to about 12 mol % $Na_2O$.

In some compositions, the glass is phosphate free or substantially free of phosphate. In some compositions, the alkali aluminosilicate glasses above have a potassium/sodium interdiffusion coefficient of at least about $2.4 \times 10^{-10}$ $cm^2/s$ at 410° C. In some embodiments, the glasses above have an annealing point from about 550° C. to about 625° C. The glass may have a strain point from about 500° C. to about 575° C. in some embodiments. In some cases, the glasses above have a softening point from about 780° C. to about 870° C. The glasses may have a viscosity of less than $10^4$ Poise at 1300° C. Additionally, the glasses above may have a density of from about 2.320 to about 2.380. Some example embodiments of the glasses above may have a coefficient of thermal expansion, $CTE_{20\text{-}300° C.}$ of from about 55 to about $75 \times 10^{-7}/°$ C.

In some embodiments, the alkali aluminosilicate glasses above are ion exchanged to a depth of layer of at least about 10 µm, 20 µm, or 30 µm. In some embodiments, the glass has a compressive layer extending from a surface of the glass to the depth of layer, and wherein the compressive layer is under a compressive stress of at least about 300 MPa. In some embodiments, the ion exchanged glasses above have a Vickers indentation crack initiation load of at least about 7 kgf. In some embodiments, the glass has a Vickers indentation crack initiation load of at least about 12 kgf. In some embodiments, the ion exchanged glasses above have a Vickers indentation crack initiation load from about 12 kgf to about 45 kgf.

Another aspect comprises a method comprising making a glass sheet by floating a glass composition comprising:
from about 60 to about 70 mol % $SiO_2$
from about 8 to about 13 mol % $Al_2O_3$
from about 9 to about 15 mol % $B_2O_3$
from about 2 to about 8 mol % MgO
from about 8 to about 13 mol % $M_2O$,
or
from about 62 to about 69 mol % $SiO_2$
from about 9 to about 12 mol % $Al_2O_3$
from about 10 to about 14 mol % $B_2O_3$
from about 3 to about 7 mol % MgO
from about 9 to about 12 mol % $Na_2O$
on a tin float bath.

In some embodiments, $M_2O$ comprises $Na_2O$. In some compositions, the glass is phosphate free or substantially free of phosphate. In some compositions, the alkali aluminosilicate glasses above have a potassium/sodium interdiffusion coefficient of at least about $2.4 \times 10^{-10}$ $cm^2/s$ at 410° C. In some embodiments, the glasses above have an annealing point from about 550° C. to about 625° C. The glass may have a strain point from about 500° C. to about 575° C. in some embodiments. In some cases, the glasses above have a softening point from about 780° C. to about 870° C. The glasses may have a viscosity of less than $10^4$ Poise at 1300° C. Additionally, the glasses above may have a density of from about 2.320 to about 2.380. Some example embodiments of the glasses above may have a coefficient of thermal expansion, $CTE_{20\text{-}300° C.}$ of from about 55 to about $75 \times 10^{-7}/°$ C.

In some cases, the process further comprises subjecting the glasses above to a post-forming heat treatment comprising cooling the glasses to room temperature (about 25° C.) at a rate of from about 150-350° C./min.

The process may further comprises ion exchanging the glass sheets to a depth of layer of at least about 10 µm, 20 µm, or 30 µm. In some cases, the glasses are ion exchanged in a $KNO_3$ bath at greater than 375° C. for greater than 4, 8, or 16 hours.

The glasses described above may have a compressive layer extending from a surface of the glass to the depth of layer, and wherein the compressive layer is under a compressive stress of at least about 300, 400, 500, or 600 MPa. In some embodiments, the ion exchanged glasses above have a Vickers indentation crack initiation load of at least about 7 kgf, 12 kgf, or 15 kgf. Some ion exchanged glasses formed by the processes above have a Vickers indentation crack initiation load from about 12 kgf to about 45 kgf.

These and other aspects, advantages, and salient features will become apparent from the following detailed description, the accompanying drawings, and the appended claims.

DETAILED DESCRIPTION

Figure 1:
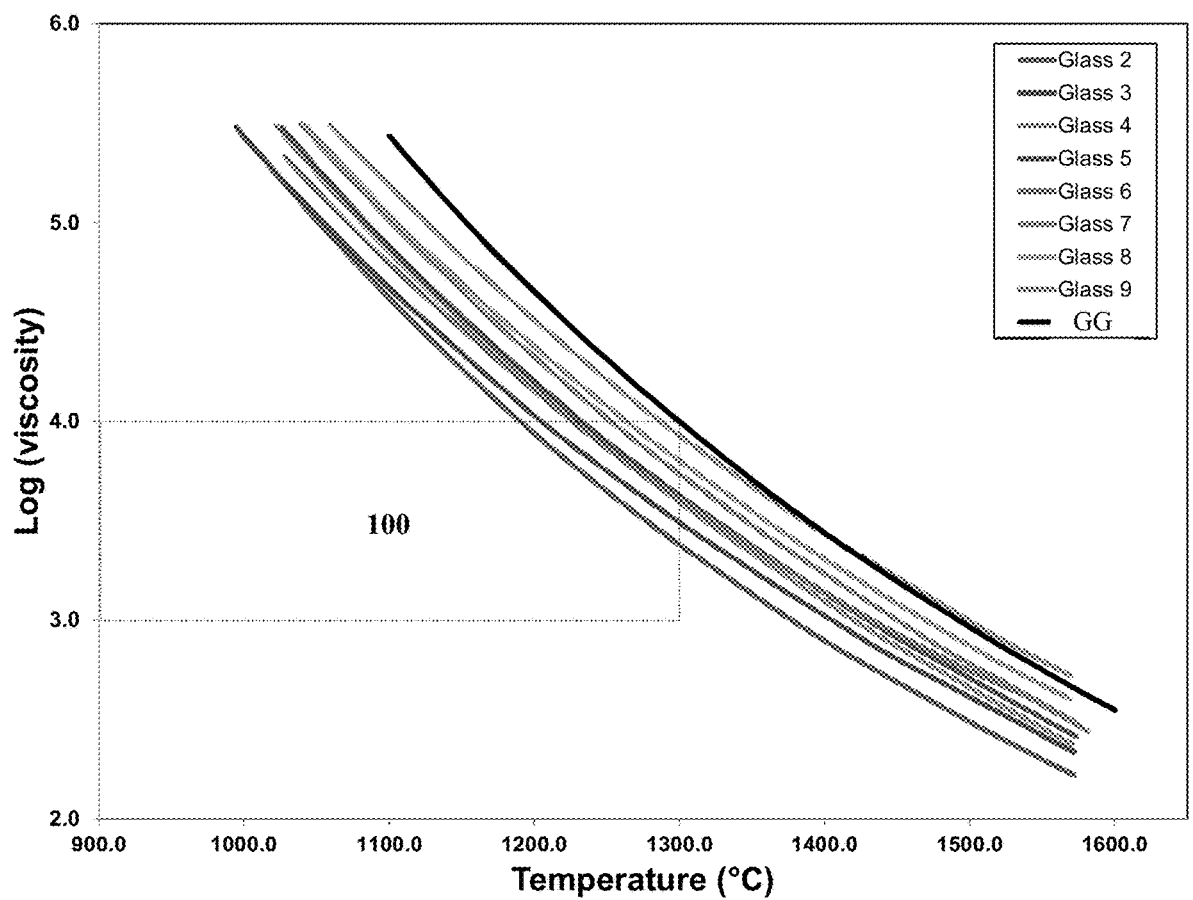
FIG. 1 shows the high temperature viscosity of glasses in Table 1. The float process window shown as 100 is determined by the tin vapor pressure, heating capacity of roof, and glass forming viscosity.

In the following detailed description, numerous specific details may be set forth in order to provide a thorough understanding of embodiments of the invention. However, it will be clear to one skilled in the art when embodiments of the invention may be practiced without some or all of these specific details. In other instances, well-known features or processes may not be described in detail so as not to unnecessarily obscure the invention. In addition, like or identical reference numerals may be used to identify common or similar elements. Moreover, unless otherwise defined, all technical and scientific terms used herein have the same meaning as commonly understood by one of ordinary skill in the art to which this invention belongs. In case of conflict, the present specification, including the definitions herein, will control.

Although other methods and can be used in the practice or testing of the invention, certain suitable methods and materials are described herein.

Disclosed are materials, compounds, compositions, and components that can be used for, can be used in conjunction with, can be used in preparation for, or are embodiments of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein.

Thus, if a class of substituents A, B, and C are disclosed as well as a class of substituents D, E, and F, and an example of a combination embodiment, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and/or C; D, E, and/or F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and/or C; D, E, and/or F; and the example combination A-D. This concept applies to all aspects of this disclosure including, but not limited to any components of the compositions and steps in methods of making and using the disclosed compositions. More specifically, the example composition ranges given herein are considered part of the specification and further, are considered to provide example numerical range endpoints, equivalent in all respects to their specific inclusion in the text, and all combinations are specifically contemplated and disclosed. Further, if there are a variety of additional steps that can be performed it is understood that each of these additional steps can be performed with any specific embodiment or combination of embodiments of the disclosed methods, and that each such combination is specifically contemplated and should be considered disclosed.

Moreover, where a range of numerical values is recited herein, comprising upper and lower values, unless otherwise stated in specific circumstances, the range is intended to include the endpoints thereof, and all integers and fractions within the range. It is not intended that the scope of the invention be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

The term "or", as used herein, is inclusive; more specifically, the phrase "A or B" means "A, B, or both A and B." Exclusive "or" is designated herein by terms such as "either A or B" and "one of A or B," for example.

The indefinite articles "a" and "an" are employed to describe elements and components of the invention. The use of these articles means that one or at least one of these elements or components is present. Although these articles are conventionally employed to signify that the modified noun is a singular noun, as used herein the articles "a" and "an" also include the plural, unless otherwise stated in specific instances. Similarly, the definite article "the", as used herein, also signifies that the modified noun may be singular or plural, again unless otherwise stated in specific instances.

For the purposes of describing the embodiments, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

It is noted that one or more of the claims may utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

As a result of the raw materials and/or equipment used to produce the glass or glass ceramic composition of the present invention, certain impurities or components that are not intentionally added, can be present in the final glass or glass ceramic composition. Such materials are present in the glass or glass ceramic composition in minor amounts and are referred to herein as "tramp materials."

As used herein, a glass or glass ceramic composition having 0 mol % of a compound is defined as meaning that the compound, molecule, or element was not purposefully added to the composition, but the composition may still comprise the compound, typically in tramp or trace amounts. Similarly, "iron-free," "sodium-free," "lithium-free," "zirconium-free," "alkali earth metal-free," "heavy metal-free" or the like are defined to mean that the compound, molecule, or element was not purposefully added to the composition, but the composition may still comprise iron, sodium, lithium, zirconium, alkali earth metals, or heavy metals, etc., but in approximately tramp or trace amounts.

The term "substantially free," when used to describe the absence of a particular oxide constituent in a glass composition, means that the constituent is present in the glass composition as a contaminant in a trace amount of less than 1 mol %.

In the embodiments of the glass compositions described herein, the concentration of constituent components (e.g., $SiO_2$, $Al_2O_3$, $B_2O_3$ and the like) are given in mole percent (mol %) on an oxide basis, unless otherwise specified.

The term "liquidus viscosity," as used herein, refers to the shear viscosity of the glass composition at its liquidus temperature.

The term "liquidus temperature," as used herein, refers to the highest temperature at which devitrification occurs in the glass composition.

The term "CTE," as used herein, refers to the coefficient of thermal expansion of the glass composition averaged over a temperature range from about 20° C. to about 300° C.

Glasses

Chemically strengthened alkali aluminosilicate glasses having high damage resistance (i.e., having Vickers cracking thresholds of greater than 15 kilograms force (kgf), and, in some embodiments, greater than 20 kgf, typically have compositions that satisfy the rule [($Al_2O_3$(mol %)+$B_2O_3$(mol %))/(Σmodifier oxides(mol %))]>1, where the modifier oxides include alkali and alkaline earth oxides. Such glasses have been previously described in U.S. patent application Ser. No. 12/858,490, filed Aug. 18, 2010, by Kristen L. Barefoot et al., entitled "Crack and Scratch Resistant Glass and Enclosures Made Therefrom," hereby incorporated by reference in its entirety.

The enhanced damage resistance of $P_2O_5$-containing alkali aluminosilicate glasses has been previously described in U.S. Provisional Patent Application No. 61/417,941, filed on Nov. 30, 2010, by Dana Craig Bookbinder et al., entitled "Ion Exchangeable Glass with Deep Compressive Layer and High Modulus," hereby incorporated by reference in its entirety. The glasses described therein contain phosphate batched with $Al_2O_3$ and $B_2O_3$ to form $AlPO_4$ and $BPO_4$, respectively, and generally follow the composition rule 0.75≤[($P_2O_5$(mol %)+$R_2O$(mol %))/$M_2O_3$(mol %)]≤1.3, where $M_2O_3$=$Al_2O_3$+$B_2O_3$.

The glass compositions described herein, principally having significant levels of $B_2O_3$ and MgO, have properties, such as the liquidus viscosity and the liquidus temperature, which make them particularly well suited for use in float forming processes, while at the same time being capable of ion exchange and retaining high crack initiation thresholds. These properties are attributable to the specific compositions of the glasses, as will be described in more detail herein.

The alkali aluminosilicate glasses and articles described herein comprise a number of chemical components. $SiO_2$ serves as the primary glass-forming oxide and functions to stabilize the networking structure of glass. The concentration of $SiO_2$ should be sufficiently high in order to provide the glass with sufficiently high chemical durability suitable for consumer applications. However, the glasses can't contain too much $SiO_2$ since the melting temperature (200 poise temperature) of pure $SiO_2$ or high-$SiO_2$ glasses is too high. Furthermore, compared to most oxides, $SiO_2$ decreases the compressive stress created by ion exchange. In some embodiments, the glass composition can comprise from about 60 to about 72 mol % $SiO_2$. In some embodiments, the glass composition can comprise from about 60 to about 70 mol % $SiO_2$. In some embodiments, the glass composition can comprise from about 62 to about 69 mol % $SiO_2$. In some embodiments, the glass composition can comprise from about 60 to about 72 mol %, about 62 to about 72 mol %, about 65 to about 72 mol %, about 67 to about 72 mol %, 60 to about 70 mol %, about 62 to about 70 mol %, about 65 to about 70 mol %, about 67 to about 70 mol %, 60 to about 67 mol %, about 62 to about 67 mol %, about 65 to about 67 mol %, about 60 to about 65 mol %, or about 62 to about 65 mol % $SiO_2$. In some embodiments, the glass composition comprises about 60, 61, 62, 63, 64, 65, 66, 67, 68, 69, 70, 71 or 72 mol % $SiO_2$.

$Al_2O_3$ can also serve as a glass former in the example glasses. Like $SiO_2$, it generally increases the viscosity of the melt and an increase in $Al_2O_3$ relative to the alkalis or alkaline earths generally results in improved durability. $Al_2O_3$ may also provide, among other benefits, for a) maintaining the lowest possible liquidus temperature, b) lowering the expansion coefficient, or c) enhancing the strain point. However, the structural role of the aluminum ions depends on the glass composition. When the concentration of alkali oxide [$M_2O$] is close to or greater than the concentration of alumina [$Al_2O_3$], all aluminum is found in tetrahedral coordination with the alkali ions acting as charge-balancers. This is the case for all of the embodied glasses. In general, $Al_2O_3$ plays an extremely important role in ion-exchangeable glasses since it enables a strong network backbone (i.e., high strain point) while allowing for the relatively fast diffusivity of alkali ions. However, because high $Al_2O_3$ concentrations generally lower the liquidus viscosity, $Al_2O_3$ concentration needs to be maintained in a reasonable range. In some embodiments, the glass composition can comprise from about 5 to about 15 mol % $Al_2O_3$. In some embodiments, the glass composition can comprise from about 8 to about 13 mol % $Al_2O_3$. In some embodiments, the glass composition can comprise from about 9 to about 12 mol % $Al_2O_3$. In some embodiments, the glass composition can comprise from about 5 to about 15 mol %, about 8 to about 15 mol %, about 9 to about 15 mol %, about 12 to about 15 mol, 5 to about 12 mol %, about 8 to about 12 mol %, about 9 to about 12 mol %, 5 to about 12 mol %, about 8 to about 12 mol %, about 9 to about 12 mol %, 5 to about 9 mol %, about 8 to about 9 mol %, or about 5 to about 8 mol % $Al_2O_3$. In some embodiments, the glass composition can comprise about 5, 6, 7, 8, 9, 10, 11, 12, 13, 14, or 15 mol % $Al_2O_3$.

The presence of $B_2O_3$ in embodiments can improve damage resistance. When boron is not charge balanced by alkali oxides or divalent cation oxides, it will be in trigonal coordination state, and thus open up the structure. The network around these trigonal coordinated boron is not as rigid as tetrahedrally coordinated ones, the bonds are "floppy," and therefore the glasses can tolerate some deformation before crack formation. In some embodiments, the glass composition can comprise from about 5 to about 15 mol % $B_2O_3$. In some embodiments, the glass composition can comprise from about 9 to about 15 mol % $B_2O_3$. In some embodiments, the glass composition can comprise from about 10 to about 14 mol % $B_2O_3$. In some embodiments, the glass composition can comprise from about 5 to about 15 mol %, about 9 to about 15 mol %, about 10 to about 15 mol %, about 12 to about 15 mol, 5 to about 14 mol %, about 9 to about 14 mol %, about 10 to about 14 mol %, 5 to about 12 mol %, about 9 to about 12 mol %, or about 10 to about 12 mol $B_2O_3$. In some embodiments, the glass composition can comprise about 5, 6, 7, 8, 9, 10, 11, 12, 13, 14, or 15 mol % $B_2O_3$.

The glasses described herein generally do not contain, or are substantially free of, $P_2O_5$. In some embodiments, about 0, >0, 0.05, 0.1, 0.2, 0.3, 0.4, 0.5, 0.6, 0.7, 0.8, 0.9, 1, 2, 3, or 4 mol % $P_2O_5$ may be present. In some embodiments, less than 4, 3, 2, or 1 mol % $P_2O_5$ may be present. In some embodiments, tramp $P_2O_5$ may be present. In some embodiments, the glass composition can comprise about 0 mol % $P_2O_5$. In some embodiments, the glass can comprise from 0 to about 1 mol % $P_2O_5$. In other embodiments, the glass can comprise greater than 0 to about 1 mol % $P_2O_5$. In some embodiments, the glass composition can comprise from 0 to about 2 mol %, 0 to about 1.5 mol %, 0 to about 1 mol %, 0 to about 0.9 mol %, 0 to about 0.8 mol % 0 to about 0.7 mol %, 0 to about 0.6 mol %, 0 to about 0.5 mol %, 0 to about 0.4 mol %, 0 to about 0.3 mol %, 0 to about 0.2 mol %, or 0 to about 0.1 mol %. The glass compositions, according to some embodiments, are free of intentionally added $P_2O_5$.

Alkali oxides ($Li_2O$, $Na_2O$, $K_2O$, $Rb_2O$, and $Cs_2O$) serve as aids in achieving low melting temperature and low liquidus temperatures. On the other hand, addition of alkali oxide dramatically increases the coefficient of thermal expansion (CTE) and lowers the chemical durability. Most importantly, to perform ion exchange, the presence of a small alkali oxide (such as $Li_2O$ and $Na_2O$) is required to exchange with larger alkali ions (e.g., $K^+$) from a salt bath. Three types of ion exchange can generally be carried out. $Na^+$-for-$Li^+$ exchange, which results in a deep depth of layer but low compressive stress. $K^+$-for-$Li^+$ exchange, which results in a small depth of layer but a relatively large compressive stress. $K^+$-for-$Na^+$ exchange, which results in intermediate depth of layer and compressive stress. A sufficiently high concentration of the small alkali oxide is necessary to produce a large compressive stress in the glass, since compressive stress is proportional to the number of alkali ions that are exchanged out of the glass. $M_2O$ is the sum of the alkali metal oxides present in the glass composition. In some cases, the glass can comprise from about 5 to about 15 mol % $M_2O$. In other embodiments, the glass can comprise about 8 to about 13 mol % $M_2O$. In other embodiments, the glass can comprise about 9 to about 12 mol % $M_2O$. In some compositions, the glass composition can comprise from about 5 to about 15 mol %, about 8 to about 15 mol %, about 9 to about 15 mol %, about 12 to about 15 mol, 5 to about 14 mol %, about 8 to about 14 mol %, about 9 to about 14 mol %, 5 to about 12 mol %, about 8 to about 12 mol %, or about 9 to about 12 mol $Na_2O$. In some embodiments, the glass composition can comprise about 5, 6, 7, 8, 9, 10, 11, 12, 13, 14, or 15 mol % $M_2O$.

$Na_2O$ may be used for ion exchange in embodied glasses. In some embodiments, the glass can comprise from about 5 to about 15 mol % $Na_2O$. In other embodiments, the glass can comprise about 8 to about 13 mol % $Na_2O$. In other embodiments, the glass can comprise about 9 to about 12 mol % $Na_2O$. In some embodiments, the glass composition can comprise from about 5 to about 15 mol %, about 8 to about 15 mol %, about 9 to about 15 mol %, about 12 to about 15 mol, 5 to about 14 mol %, about 8 to about 14 mol %, about 9 to about 14 mol %, 5 to about 12 mol %, about 8 to about 12 mol %, or about 9 to about 12 mol $Na_2O$. In some embodiments, the glass composition can comprise about 5, 6, 7, 8, 9, 10, 11, 12, 13, 14, or 15 mol % $Na_2O$.

$K_2O$ in some embodiments can be used for ion exchange, but can be detrimental to compressive stress. In some embodiments, the glass compositions are free of $K_2O$. The glass compositions are substantially $K_2O$-free, for example, when the content of $K_2O$ is 0.5 mol percent or less, 0.25 mol % or less, 0.1 mol % or less, about 0.05 mol % or less, 0.001 mol % or less, 0.0005 mol % or less, or 0.0001 mol % or less. The glass sheets, according to some embodiments, are free of intentionally added sodium. In some embodiments, the glass can comprise from 0 to about 1 mol % $K_2O$. In other embodiments, the glass can comprise greater than 0 to about 1 mol % $K_2O$. In some embodiments, the glass composition can comprise from 0 to about 2 mol %, 0 to about 1.5 mol %, 0 to about 1 mol %, 0 to about 0.9 mol %, 0 to about 0.8 mol % 0 to about 0.7 mol %, 0 to about 0.6 mol %, 0 to about 0.5 mol %, 0 to about 0.4 mol %, 0 to about 0.3 mol %, 0 to about 0.2 mol %, or 0 to about 0.1 mol %. In some embodiments, the glass can comprise about 0, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, or 1 mol % $K_2O$.

Divalent cation oxides (such as alkaline earth oxides) also improve the melting behavior of the glass, but with respect to ion exchange performance, the presence of divalent cations acts to decrease alkali mobility. The negative effect on ion exchange performance is especially pronounced with the larger divalent cations. Furthermore, the smaller divalent cation oxides generally help the compressive stress more than the larger ones. Hence, MgO offers several advantages with respect to improved stress relaxation while minimizing the adverse effects on alkali diffusivity. However, when the contents of MgO are high, they are prone to form forsterite ($Mg_2SiO_4$), thus causing the liquidus temperature to rise very steeply with the MgO contents above certain level. Herein, the embodied glasses contain MgO as the primary divalent cation oxide. As defined herein, R'O comprises the mol % of MgO, CaO, SrO, and BaO in the glass composition. In some example embodiments, the glass composition can comprise from about 2 to about 25 mol % RO. In some compositions, the glass composition can comprise from about 2 to about 15 mol % RO. In other compositions, the glass composition can comprise from about 3 to about 10 mol % RO. In some embodiments, the glass composition can comprise from about 2 to about 25 mol %, about 2 to about 20 mol %, about 2 to about 15 mol %, about 2 to about 10 mol %, about 2 to about 7 mol %, about 3 to about 25 mol %, about 3 to about 20 mol %, about 3 to about 15 mol %, about 3 to about 10 mol %, about 3 to about 7 mol %, about 5 to about 25 mol %, about 5 to about 20 mol %, about 5 to about 15 mol %, about 5 to about 10 mol %, about 5 to about 7 mol %, about 7 to about 25 mol %, about 7 to about 20 mol %, about 7 to about 15 mol %, or about 7 to about 10 mol % RO. In some embodiments, the glass composition can comprise about 2, 3, 4, 5, 6, 7, 8, 9, 10, 11, 12, 13, 14, 15, 16, 17, 18, 19, 20, 21, 22, 23, 24, or 25 mol % RO.

The glass can comprise about 2 to about 10 mol % MgO. In some compositions, the glass composition can comprise about 2 to about 8 mol % MgO. In other cases, the glass composition can comprise about 3 to about 10 mol % MgO. In some embodiments, the glass composition can comprise about 2 to about 10 mol %, about 2 to about 8 mol %, about 2 to about 7 mol %, about 2 to about 5 mol %, about 3 to about 10 mol %, about 3 to about 8 mol %, about 3 to about 7 mol %, about 3 to about 5 mol %, about 5 to about 10 mol %, about 5 to about 8 mol %, or about 5 to about 7 mol % MgO. In some embodiments, the glass compositions can comprise about 0, 2, 3, 4, 5, 6, 7, 8, 9, or 10 mol % MgO.

In some embodiments, CaO can contribute to higher strain point, lower density, and lower melting temperature. CaO sources include limestone, an inexpensive material, so to the extent that volume and low cost are factors, in some embodiments it is can be useful to make the CaO content as high as can be reasonably achieved relative to other alkaline earth oxides. SrO and BaO can contribute to higher coefficient of thermal expansion, and the relative proportion of MgO, CaO, SrO and BaO can be manipulated to improve liquidus temperature, and thus liquidus viscosity. The glasses embodied herein can independently comprise 0 to 10 mol % CaO, SrO, and BaO. In some embodiments, the glass composition can independently comprise from >0 to about 10 mol % CaO, SrO, and BaO. The glass composition can comprise from 0 to about 10 mol %, 0 to about 8 mol %, 0 to about 5 mol %, 0 to 3 mol %, 0 to about 1 mol %, >0 to about 10 mol %, >0 to about 8 mol %, >0 to about 6 mol %, >0 to about 5 mol %, >0 to 3 mol %, >0 to about 1 mol %, about 2 to about 10 mol %, about 2 to about 8 mol %, about 2 to about 6 mol %, about 2 to about 5 mol %, about 3 to about 10 mol %, about 3 to about 8 mol %, about 3 to about 6 mol %, about 3 to about 5 mol %, about 5 to about 10 mol %, or about 5 to about 8 mol % CaO, SrO, and BaO. In some cases, the glass composition can comprise about 0, >0, 1, 2, 3, 4, 5, 6, 7, 8, 9, or 10 mol % CaO, SrO, and BaO.

Concentrations of $ZrO_2$ may optionally be found in the glass as a function of the forming process or added as an additional component. In some embodiments, the glass can comprise from 0 to about 3 mol %, 0 to about 2 mol %, 0 to about 1 mol %, 0 to 0.5 mol %, 0 to 0.1 mol %, 0 to 0.05 mol %, 0 to 0.01 mol %, >0 to about 3 mol %, >0 to about 2 mol %, >0 to about 1 mol %, >0 to 0.5 mol %, >0 to 0.1 mol %, >0 to 0.05 mol % $ZrO_2$.

As a result of the raw materials and/or equipment used to produce the glass or glass ceramic composition of the present invention, certain impurities or components that are not intentionally added, can be present in the final glass or glass ceramic composition. Such materials are present in the glass or glass ceramic composition in minor amounts and are referred to herein as "tramp materials."

As used herein, a glass or glass ceramic composition having 0 mol % of a compound is defined as meaning that the compound, molecule, or element was not purposefully added to the composition, but the composition may still comprise the compound, typically in tramp or trace amounts. Similarly, "iron-free," "sodium-free," "lithium-free," "zirconium-free," "alkali earth metal-free," "heavy metal-free" or the like are defined to mean that the compound, molecule, or element was not purposefully added to the composition, but the composition may still comprise iron, sodium, lithium, zirconium, alkali earth metals, or heavy metals, etc., but in approximately tramp or trace amounts. Tramp compounds that may be found in glass or glass ceramic embodied herein include, but are not limited to, $Na_2O$, $TiO_2$, $MnO$, $ZnO$, $Nb_2O_5$, $MoO_3$, $Ta_2O_5$, $WO_3$, $ZrO_2$, $Y_2O_3$, $La_2O_3$, $HfO_2$, $CdO$, $SnO_2$, $Fe_2O_3$, $CeO_2$, $As_2O_3$, $Sb_2O_3$, sulfur-based compounds, such as sulfates, halogens, or combinations thereof.

In some embodiments, the glass or glass ceramic further includes a chemical fining agent. Such fining agents include, but are not limited to, $SnO_2$, $As_2O_3$, $Sb_2O_3$, F, Cl and Br. In some embodiments, the concentrations of the chemical fining agents are kept at a level of 3, 2, 1, or 0.5, >0 mol %. In some embodiments, the fining agent amount is from >0 to about 3 mol %. Chemical fining agents may also include $CeO_2$, $Fe_2O_3$, and other oxides of transition metals, such as $MnO_2$. These oxides may introduce color to the glass or glass ceramic via visible absorptions in their final valence state(s) in the glass, and thus, when present, their concentration is usually kept at a level of 0.5, 0.4, 0.3, 0.2, 0.1 or >0 mol %.

Compared to $As_2O_3$ and $Sb_2O_3$ fining, tin fining (i.e., $SnO_2$ fining) is less effective, but $SnO_2$ is a ubiquitous material that has no known hazardous properties. Tin fining can be used alone or in combination with other fining techniques if desired. For example, tin fining can be combined with halide fining, e.g., bromine fining. Other possible combinations include, but are not limited to, tin fining plus sulfate, sulfide, cerium oxide, mechanical bubbling, and/or vacuum fining. It is contemplated that these other fining techniques can be used alone. U.S. Pat. Nos. 5,785,726, 6,128,924, 5,824,127 and co-pending U.S. application Ser. No. 11/116,669, all of which are hereby incorporated by reference in their entireties, disclose processes for manufacturing arsenic-free glasses. U.S. Pat. No. 7,696,113, incorporated by reference in its entirety, discloses a process for manufacturing arsenic- and antimony-free glass using iron and tin to minimize gaseous inclusions.

The glasses or glass ceramics can also contain $SnO_2$ either as a result of Joule melting using tin-oxide electrodes, through the batching of tin containing materials, e.g., $SnO_2$, $SnO$, $SnCO_3$, $SnC_2O_2$, etc., or through addition of $SnO_2$ as an agent to adjust various physical, melting, and forming attributes. The glass can comprise from 0 to about 3 mol %, 0 to about 2 mol %, 0 to about 1 mol %, 0 to 0.5 mol %, or 0 to 0.1 mol % $SnO_2$.

In some embodiments, the glass can be substantially free of $Sb_2O_3$, $As_2O_3$, or combinations thereof. For example, the glass can comprise 0.05 weight percent or less of $Sb_2O_3$ or $As_2O_3$ or a combination thereof, the glass may comprise zero weight percent of $Sb_2O_3$ or $As_2O_3$ or a combination thereof, or the glass may be, for example, free of any intentionally added $Sb_2O_3$, $As_2O_3$, or combinations thereof.

Additional components can be incorporated into the glass compositions to provide additional benefits or alternatively, can further comprise contaminants typically found in commercially-prepared glass. For example, additional components can be added to adjust various physical, melting, and forming attributes. The glasses, according to some embodiments, can also include various contaminants associated with batch materials and/or introduced into the glass by the melting, fining, and/or forming equipment used to produce the glass (e.g., $ZrO_2$). In some embodiments, the glass may comprise one or more compounds useful as ultraviolet radiation absorbers. In some embodiments, the glass can comprise 3 mol % or less $TiO_2$, $MnO$, $ZnO$, $Nb_2O_5$, $MoO_3$, $Ta_2O_5$, $WO_3$, $ZrO_2$, $Y_2O_3$, $La_2O_3$, $HfO_2$, $CdO$, $Fe_2O_3$, $CeO_2$, halogens, or combinations thereof. In some embodiments, the glass can comprise from 0 to about 3 mol %, 0 to about 2 mol %, 0 to about 1 mol %, 0 to 0.5 mol %, 0 to 0.1 mol %, 0 to 0.05 mol %, or 0 to 0.01 mol % $TiO_2$, MnO, ZnO, $Nb_2O_5$, $MoO_3$, $Ta_2O_5$, $WO_3$, $ZrO_2$, $Y_2O_3$, $La_2O_3$, $HfO_2$, CdO, $CeO_2$, $Fe_2O_3$, halogens, or combinations thereof.

Non-limiting examples of embodied glasses are listed in Table 1. The compositions were analyzed by x-ray fluorescence and ICP. Anneal and strain points were determined by beam bending viscometry. Softening point was determined by parallel plate viscometry. Coefficient of thermal expansion (CTE) is the average value between 20° C. and 300° C.

Figure 2A:
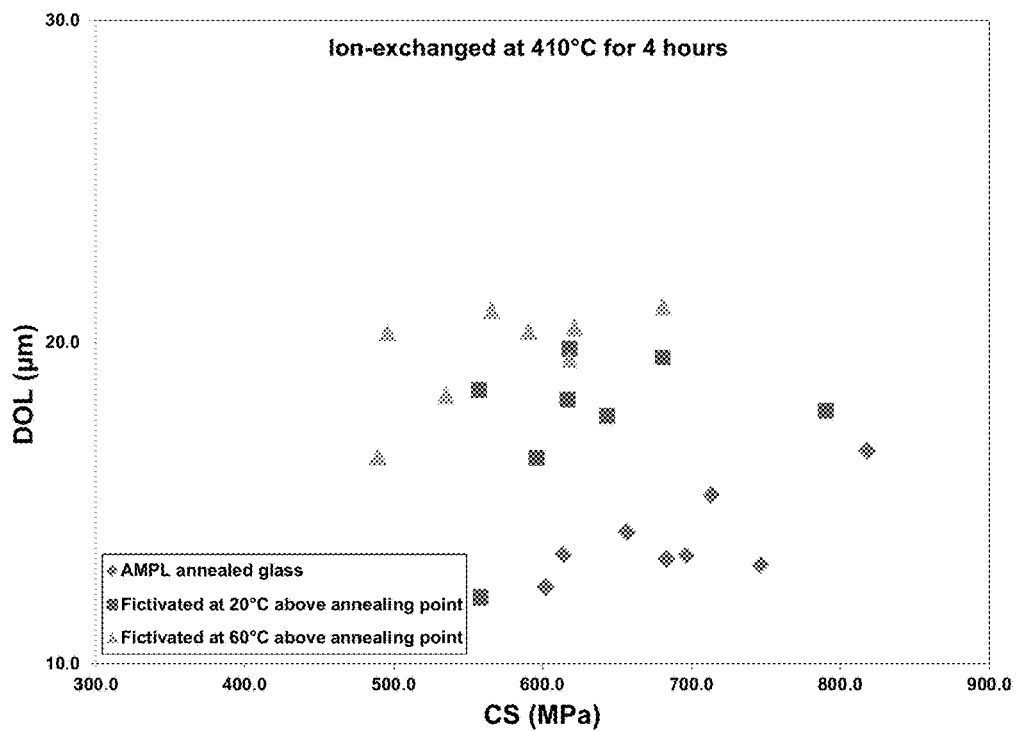
FIGS. 2A-2C present data showing the average DOL vs CS values for glasses listed in Table 1 after ion-exchanging at 410° C. for 4, 8 and 16 hours. The ion exchanging was performed for annealed glass, and those fictivated at 20° C. and 60° C. above annealing point.
Figure 2B:
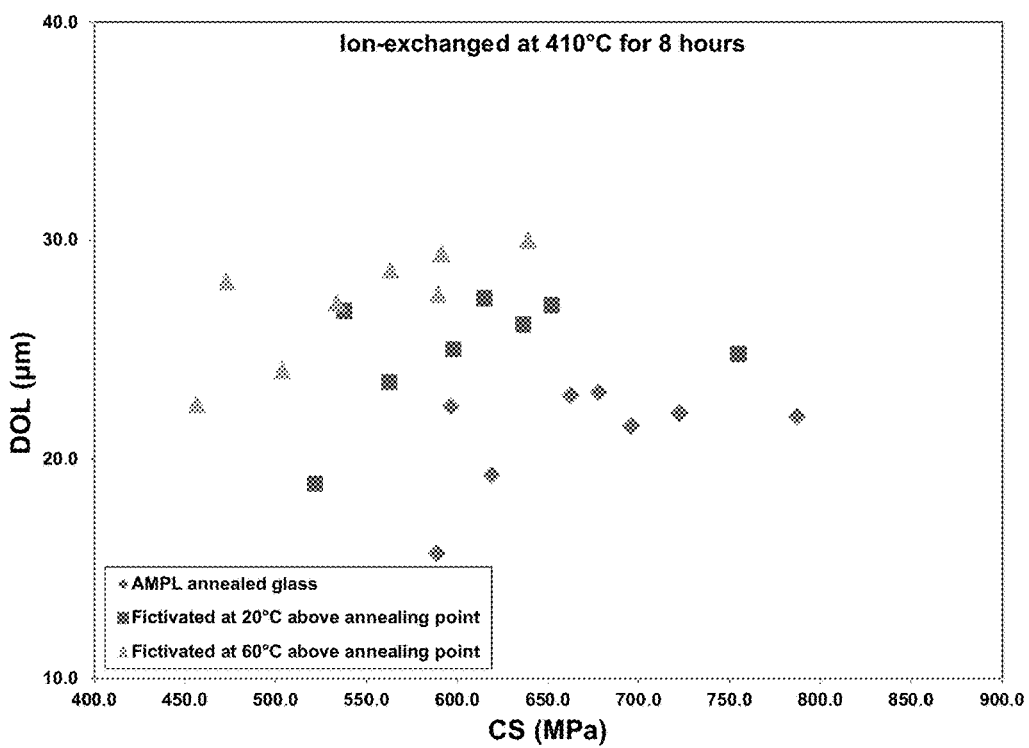
Figure 2C:
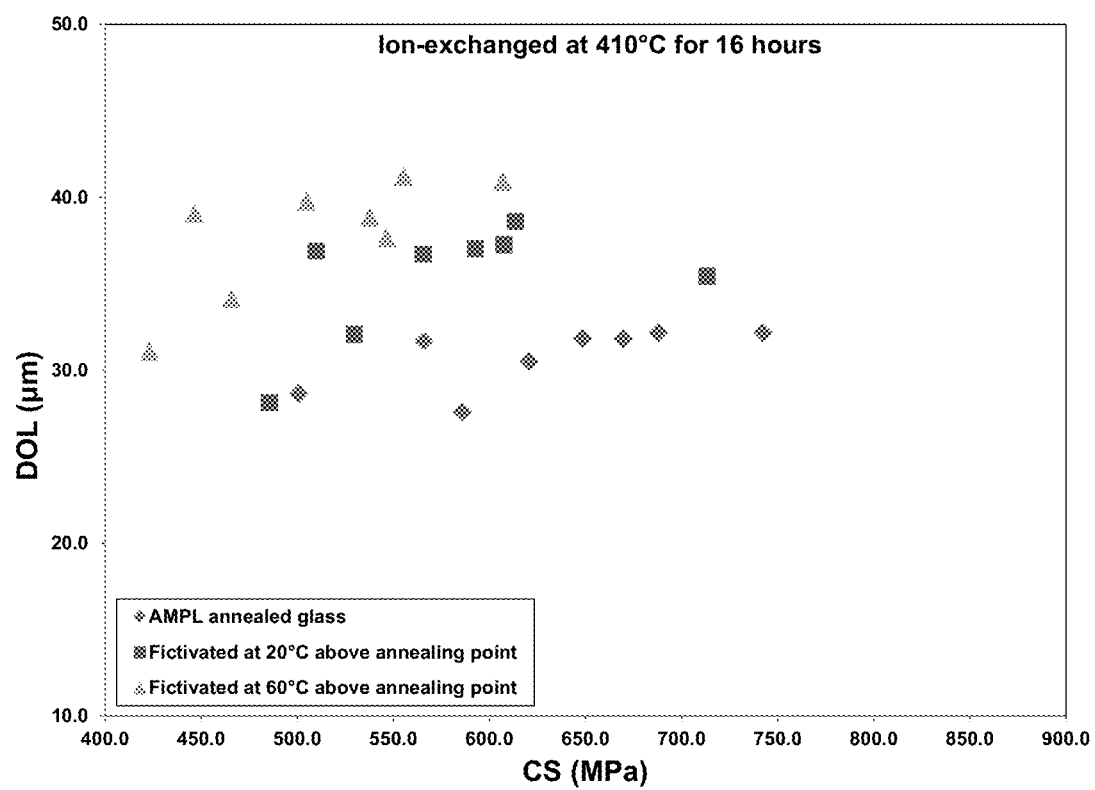

Table 2 presents ion exchange properties of the glasses from Table 1. The data in Table 2 is pictorially represented in FIGS. 2A-2C. The ion exchanges were performed for annealed glasses, and glasses fictivated at temperatures 20° C. and 60° C. above annealing point, respectively. The compressive stress (CS) and depth of layer (DOL) were obtained as a result of treatment of samples in refined grade $KNO_3$. The ion-exchange treatments were carried out at 410° C. for 4, 8 and 16 hours. The CS and DOL are stated in the units of MPa and respectively.

TABLE 1

| | Composition (mol %) | | | | | | | |
|---|---|---|---|---|---|---|---|---|
| | 2 | 3 | 4 | 5 | 6 | 7 | 8 | 9 |
| $Al_2O_3$ | 10.0 | 10.0 | 12.0 | 10.0 | 10.0 | 11.0 | 9.7 | 8.9 |
| $Na_2O$ | 9.8 | 9.8 | 11.8 | 9.8 | 9.8 | 10.8 | 9.8 | 8.8 |
| MgO | 7.1 | 3.0 | 3.1 | 5.1 | 3.1 | 3.0 | 3.0 | 3.0 |
| $B_2O_3$ | 9.7 | 13.4 | 9.7 | 9.7 | 11.7 | 9.7 | 9.8 | 9.8 |
| $SiO_2$ | 63.3 | 63.5 | 63.2 | 65.3 | 65.3 | 65.3 | 67.4 | 69.2 |
| $SnO_2$ | 0.2 | 0.2 | 0.2 | 0.2 | 0.2 | 0.2 | 0.2 | 0.2 |
| Anneal Pt (° C.): | 595 | 565 | 585 | 590 | 572 | 592 | 586 | 589 |
| Strain Pt (° C.): | 549 | 518 | 536 | 542 | 523 | 542 | 536 | 537 |
| Softening Pt (° C.): | 815.4 | 792.5 | 826.8 | 824.2 | 816.2 | 839.3 | 838.7 | 855.4 |
| Density (g/cm³): | 2.378 | 2.327 | 2.368 | 2.360 | 2.336 | 2.355 | 2.342 | 2.328 |
| CTE (×10⁻⁷/° C.): | 62.8 | 61.3 | 67.8 | 61.1 | 61.3 | 65.1 | 60.4 | 57.3 |

As shown in FIG. 1, the high temperature viscosities of the embodied glasses intersect the optimal process window for float-based technologies. This process window is determined by the tin vapor pressure, heating capacity of roof and glass forming viscosity, as noted in U.S. Pat. No. 6,065,309, and U.S. Pat. Publ. Nos. 2006/0288736 and 2008/0028795, all of which are hereby incorporated by reference in their entireties.

Ion exchange is widely used to chemically strengthen glass articles for use in in consumer electronics, automotive applications, appliances, architectural components, and other areas where high levels of damage resistance are desirable. In the ion exchange process, a glass article containing a first metal ion (e.g., alkali cations in $Li_2O$, $Na_2O$, etc.) is at least partially immersed in or otherwise contacted with an ion exchange bath or medium containing a second metal ion that is either larger or smaller than the first metal ion that is present in the glass. The first metal ions diffuse from the glass surface into the ion exchange bath/medium while the second metal ions from the ion exchange bath/medium replace the first metal ions in the glass to a depth of layer below the surface of the glass. The substitution of larger ions for smaller ions in the glass creates a compressive stress at the glass surface, whereas substitution of smaller ions for larger ions in the glass typically creates a tensile stress at the surface of the glass. In some embodiments, the first metal ion and second metal ion are monovalent alkali metal ions. However, other monovalent metal ions such as $Ag^+$, $Tl^+$, $Cu^+$, and the like may also be used in the ion exchange process. In those instances where at least one of $Ag^+$ and $Cu^+$ is exchanged for metal ions in the glass, such glasses may be particularly useful for anti-viral and/or anti-microbial applications.

TABLE 2

| | Composition | | | | | | | |
|---|---|---|---|---|---|---|---|---|
| | 2 | 3 | 4 | 5 | 6 | 7 | 8 | 9 |
| | Annealed | | | | | | | |
| CS (MPa) | 713.4 | 601.9 | 818.2 | 696.4 | 656.9 | 746.4 | 683.1 | 613.9 |
| DOL (μm) | 15.2 | 12.4 | 16.6 | 13.4 | 14.1 | 13.1 | 13.2 | 13.4 |
| IOX temp. (° C.) | 410 | 410 | 410 | 410 | 410 | 410 | 410 | 410 |
| IOX time (h) | 4 | 4 | 4 | 4 | 4 | 4 | 4 | 4 |
| CS (MPa) | 696.1 | 588.7 | 787.2 | 678.3 | 619.1 | 722.4 | 662.7 | 596.4 |
| DOL (μm) | 21.5 | 15.7 | 22.0 | 23.1 | 19.3 | 22.1 | 22.9 | 22.4 |
| IOX temp. (° C.) | 410 | 410 | 410 | 410 | 410 | 410 | 410 | 410 |
| IOX time (h) | 8 | 8 | 8 | 8 | 8 | 8 | 8 | 8 |
| CS (MPa) | 669.6 | 648.6 | 742.5 | 500.7 | 585.9 | 687.9 | 620.9 | 566.0 |
| DOL (μm) | 31.8 | 31.8 | 32.2 | 28.6 | 27.6 | 32.2 | 30.5 | 31.7 |
| IOX temp. (° C.) | 410 | 410 | 410 | 410 | 410 | 410 | 410 | 410 |
| IOX time (h) | 16 | 16 | 16 | 16 | 16 | 16 | 16 | 16 |
| | Fictivated at 20° C. above annealing point | | | | | | | |
| CS (MPa) | 643.6 | 558.7 | 790.6 | 618.4 | 596.0 | 680.7 | 616.9 | 557.4 |
| DOL (μm) | 17.7 | 12.1 | 17.9 | 19.8 | 16.4 | 19.5 | 18.2 | 18.5 |
| IOX temp. (° C.) | 410 | 410 | 410 | 410 | 410 | 410 | 410 | 410 |
| IOX time (h) | 4 | 4 | 4 | 4 | 4 | 4 | 4 | 4 |
| CS (MPa) | 636.4 | 522.0 | 754.9 | 615.0 | 562.5 | 652.1 | 597.9 | 538.0 |
| DOL (μm) | 26.2 | 18.9 | 24.8 | 27.4 | 23.5 | 27.1 | 25.0 | 26.8 |
| IOX temp. (° C.) | 410 | 410 | 410 | 410 | 410 | 410 | 410 | 410 |
| IOX time (h) | 8 | 8 | 8 | 8 | 8 | 8 | 8 | 8 |
| CS (MPa) | 607.6 | 485.7 | 713.4 | 592.8 | 529.7 | 613.6 | 565.6 | 509.8 |
| DOL (μm) | 37.2 | 28.1 | 35.4 | 37.0 | 32.1 | 38.6 | 36.7 | 36.9 |
| IOX temp. (° C.) | 410 | 410 | 410 | 410 | 410 | 410 | 410 | 410 |
| IOX time (h) | 16 | 16 | 16 | 16 | 16 | 16 | 16 | 16 |
| | Fictivated at 60° C. above annealing point | | | | | | | |
| CS (MPa) | 618.2 | 489.6 | 680.5 | 590.8 | 535.1 | 621.5 | 565.7 | 495.7 |
| DOL (μm) | 19.5 | 16.4 | 21.1 | 20.3 | 18.3 | 20.5 | 21.0 | 20.3 |
| IOX temp. (° C.) | 410 | 410 | 410 | 410 | 410 | 410 | 410 | 410 |

TABLE 2-continued

| | Composition | | | | | | | |
|---|---|---|---|---|---|---|---|---|
| | 2 | 3 | 4 | 5 | 6 | 7 | 8 | 9 |
| IOX time (h) | 4 | 4 | 4 | 4 | 4 | 4 | 4 | 4 |
| CS (MPa) | 589.4 | 456.6 | 639.0 | 563.2 | 503.7 | 591.4 | 534.0 | 472.9 |
| DOL (μm) | 27.6 | 22.5 | 30.0 | 28.7 | 24.1 | 29.4 | 27.2 | 28.2 |
| IOX temp. (° C.) | 410 | 410 | 410 | 410 | 410 | 410 | 410 | 410 |
| IOX time (h) | 8 | 8 | 8 | 8 | 8 | 8 | 8 | 8 |
| CS (MPa) | 546.4 | 423.1 | 607.0 | 537.7 | 465.9 | 555.4 | 505.0 | 446.5 |
| DOL (μm) | 37.6 | 31.1 | 40.9 | 38.8 | 34.1 | 41.2 | 39.8 | 39.1 |
| IOX temp. (° C.) | 410 | 410 | 410 | 410 | 410 | 410 | 410 | 410 |
| IOX time (h) | 16 | 16 | 16 | 16 | 16 | 16 | 16 | 16 |

In some embodiments, the glasses and glass articles described herein may be ion exchanged to achieve a compressive stress of at least about 300 MPa and/or a depth of compressive layer of at least about 10 μm. In some embodiments, the glasses and glass articles described herein may be ion exchanged to achieve a compressive stress of at least about 500 MPa and/or a depth of compressive layer of at least about 40 μm. In some embodiments, the glass is ion exchanged to achieve a compressive stress of at least about 200, 300, 400, 500, or 600 MPa. In some embodiments, the glass is ion exchanged to achieve a depth of layer of at least about 10 μm, 20 μm, 30 μm, or 40 μm, or more.

In addition to high damage resistance, the glasses described herein may be ion exchanged to achieve desired levels of compressive stress and compressive depth of layer in relatively short times. Following ion exchange at 410° C. for 4 hours in molten $KNO_3$ salt, for example, a compressive layer having a compressive stress of greater than about 500 MPa and a depth of compressive layer of greater than about 15 μm may be achieved in these glasses. In some embodiments, the ion exchange is done at about 400° C., 410° C., 420° C., 430° C., 440° C., 450° C., 460° C., 470° C., 480° C., 490° C., 500° C., 510° C., 520° C., 530° C., 540° C., or 550° C. or greater. In some embodiments, the ion exchange is done for about 0.5, 1, 2, 3, 4, 5, 6, 7, 8, 9, 10, or more than 10 hours.

The ability to ion exchange the glasses described herein may be at least partially attributable to the fact that these glasses have interdiffusion coefficients that are significantly greater that those of other floatable glasses that are used in applications in which damage resistance, as characterized by the Vickers crack initiation threshold of the glass, is a desirable attribute. At 410° C., the glasses described herein have a potassium/sodium interdiffusion coefficient of at least about $2.4\times10^{-10}$ cm$^2$/s, $3.0\times10^{-10}$ cm$^2$/s, $4.0\times10^{-10}$ cm$^2$/s, or $4.5\times10^{-10}$ cm$^2$/s, $6.0\times10^{-10}$ cm$^2$/s, $7.5\times10^{-10}$ cm$^2$/s, $9.0\times10^{-10}$ cm$^2$/s, $1.0\times10^{-9}$ cm$^2$/s, $1.2\times10^{-9}$ cm$^2$/s, $1.5\times10^{-9}$ cm$^2$/s and in some embodiments, in a range from about $2.4\times10^{-10}$ cm$^2$/s, $3.0\times10^{-10}$ cm$^2$/s, $4.0\times10^{-10}$ cm$^2$/s, or $4.5\times10^{-10}$ cm$^2$/s up to about $7.5\times10^{-10}$ cm$^2$/s, $9.0\times10^{-10}$ cm$^2$/s, $1.0\times10^{-9}$ cm$^2$/s, $1.2\times10^{-9}$ cm$^2$/s, or $1.5\times10^{-9}$ cm$^2$/s. In contrast to these glasses, the alkali aluminosilicate glasses described in U.S. patent application Ser. Nos. 12/858,490, 12/856,840, and 12/392,577, herein incorporated by reference in their entireties, have potassium/sodium interdiffusion coefficients of less than $1.5\times10^{-10}$ cm$^2$/s.

Vickers indentation cracking threshold measurements described herein are performed by applying and then removing an indentation load to the glass surface at a rate of 0.2 mm/min. The maximum indentation load is held for 10 seconds. The indentation cracking threshold is defined at the indentation load at which 50% of 10 indents exhibit any number of radial/median cracks emanating from the corners of the indent impression. The maximum load is increased until the threshold is met for a given glass composition. All indentation measurements are performed at room temperature in 50% relative humidity.

Figure 3A:
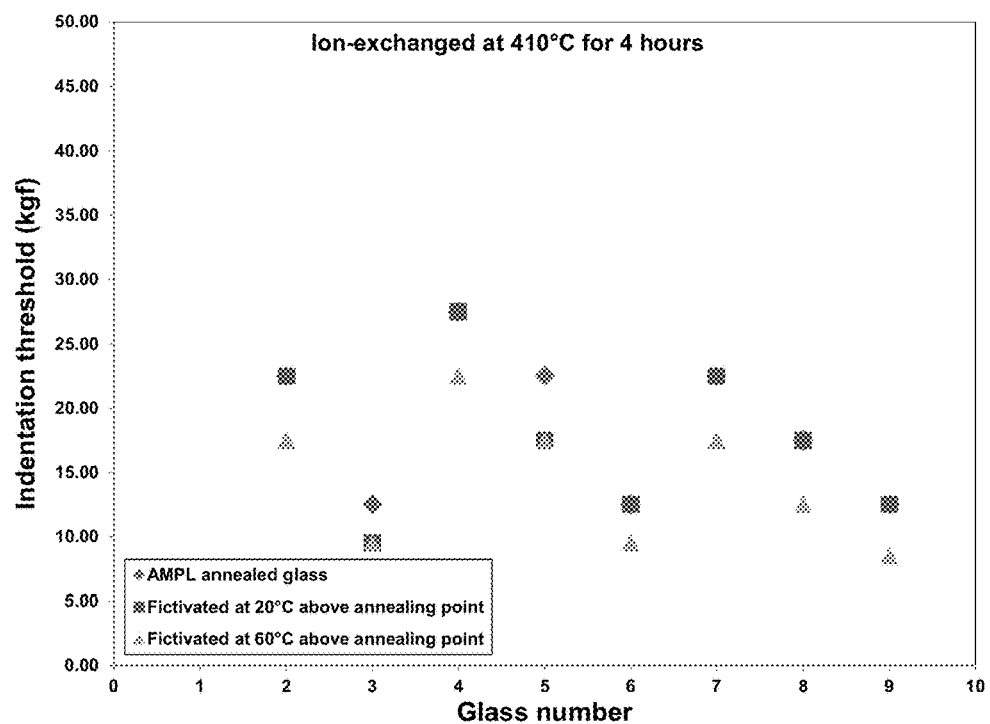
FIGS. 3A-3C present data showing the Vickers indentation threshold performance for glasses compositions in Table 1. Glasses were ion-exchanged at 410° C. for 4, 8 and 16 hours. The ion exchanging was performed for annealed glass, and those fictivated at 20° C. and 60° C. above annealing point.
Figure 3B:
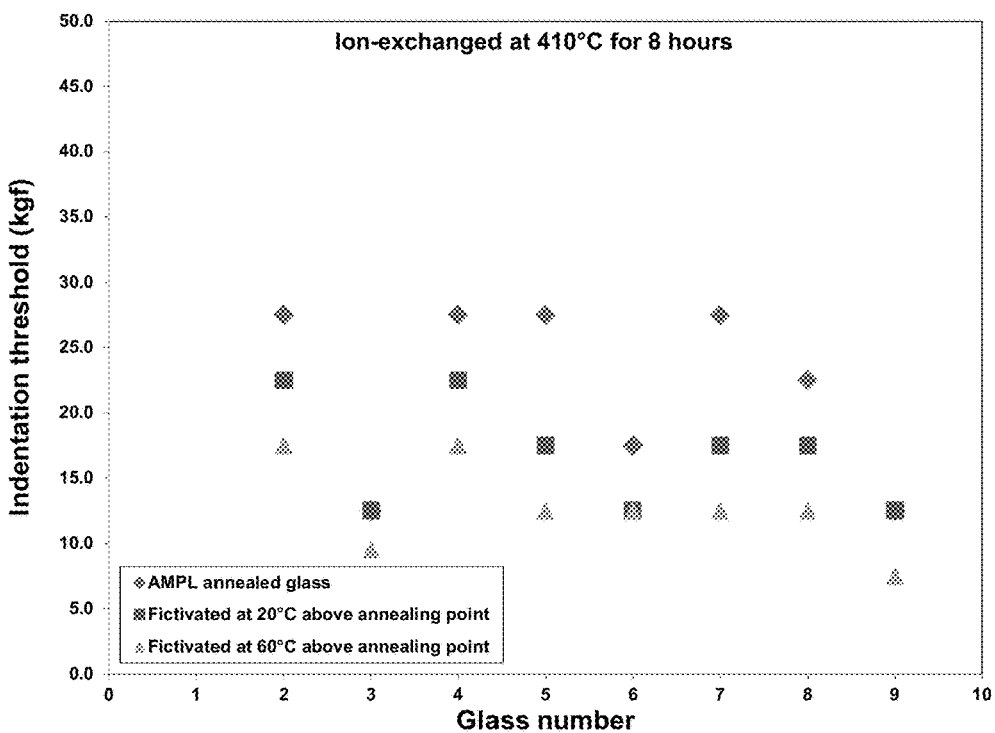
Figure 3C:
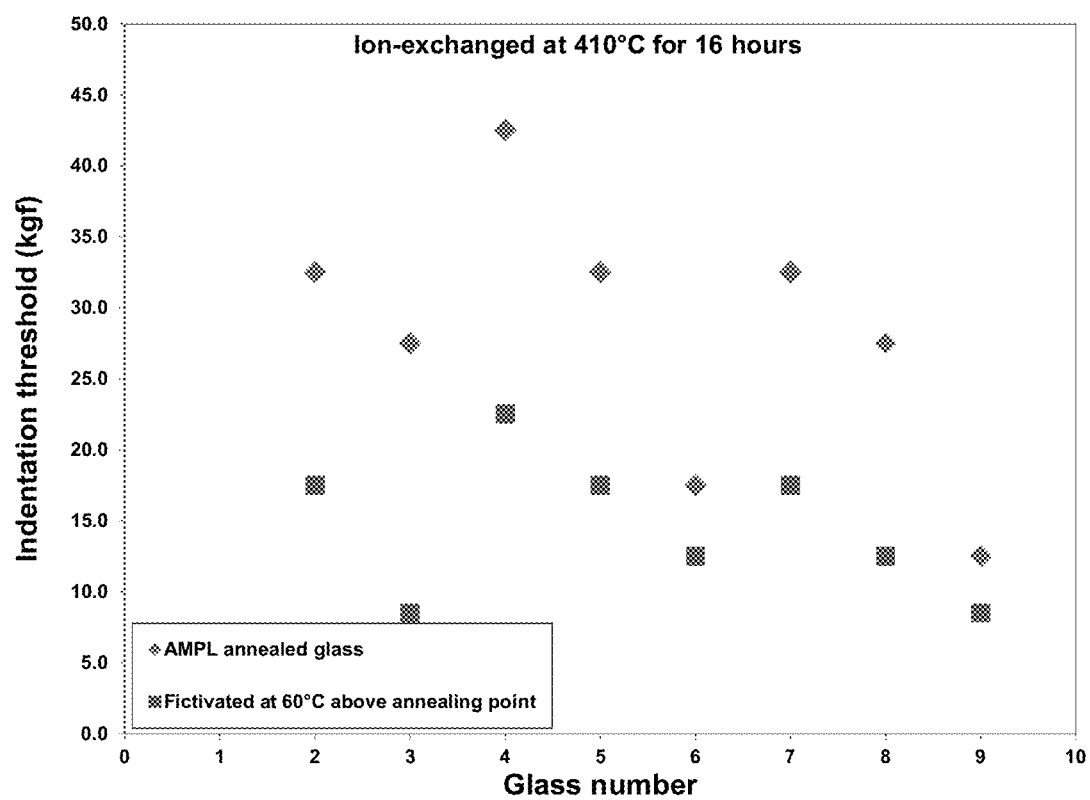

In some embodiments, the glass compositions have high damage resistance. In some cases, the glass compositions have Vickers cracking thresholds of greater than 7 kilograms force (kgf). In some embodiments, the glass compositions have Vickers cracking thresholds of greater than 12 kgf, 15 kgf, 20 kgf, 25 kgf, 30 kgf, or 40 kgf FIGS. 3A-3C pictorially show the indentation threshold performance for glasses compositions in Table 1. Glasses were ion-exchanged at 410° C. for 4, 8 and 16 hours. The ion exchanging was performed for annealed glass, and those fictivated at 20° C. and 60° C. above annealing point.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

What is claimed is:

1. A glass composition comprising:
   from 65 to 72 mol % $SiO_2$
   from 8 to 13 mol % $Al_2O_3$
   from 9 to 15 mol % $B_2O_3$
   from 3 to 10 mol % MgO
   from 8 to 12 mol % $Na_2O$ and
   from 8 to 12 mol % $M_2O$ wherein $M_2O$ is $Li_2O$, $Na_2O$, $K_2O$, $Rb_2O$, and $Cs_2O$
wherein said glass composition is capable of being formed into sheets via a float process and has a Vickers indentation crack initiation load of at least about 12 kgf after ion exchange.

2. The glass composition of claim 1, comprising:
   from 65 to 69 mol % $SiO_2$
   from 9 to 12 mol % $Al_2O_3$
   from 10 to 14 mol % $B_2O_3$
   from 3 to 7 mol % MgO
   from 9 to 12 mol % $Na_2O$.

3. The glass composition of claim 1, wherein the glass is substantially free of phosphate or CaO.

4. The glass composition of claim 1, wherein the glass has a strain point from about 500° C. to about 575° C.

5. The glass composition of claim 1, wherein the glass has a viscosity of less than $10^4$ Poise at 1300° C.

6. The glass composition of claim 1, wherein the glass has a density of from about 2.320 g/cm$^3$ to about 2.380 g/cm$^3$.

7. The glass composition of claim 1, wherein the glass has a coefficient of thermal expansion, $CTE_{20\text{-}300°\ C.}$ of from about 55 to about $75\times10^{-7}$/° C.

8. The glass composition of claim 1, wherein the glass is ion exchanged to a depth of layer of at least about 10 μm.

9. The glass composition of claim 8, wherein the glass has a compressive layer extending from a surface of the glass to the depth of layer, and wherein the compressive layer is under a compressive stress of at least about 300 MPa.

10. The glass composition of claim 1, wherein glass has a Vickers indentation crack initiation load of at least about 15 kgf.

* * * * *